United States Patent
Yamada et al.

(10) Patent No.: US 9,331,523 B2
(45) Date of Patent: May 3, 2016

(54) POWER CONTROL DEVICE AND POWER CONTROL METHOD

(75) Inventors: Junichiro Yamada, Kizugawa (JP); Takeo Nishikawa, Kyoto (JP); Wataru Okada, Kizugawa (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/001,971

(22) PCT Filed: Mar. 22, 2011

(86) PCT No.: PCT/JP2011/056749
§ 371 (c)(1),
(2), (4) Date: Nov. 12, 2013

(87) PCT Pub. No.: WO2012/124130
PCT Pub. Date: Sep. 20, 2012

(65) Prior Publication Data
US 2014/0062202 A1 Mar. 6, 2014

(30) Foreign Application Priority Data
Mar. 15, 2011 (JP) ................. 2011-056954

(51) Int. Cl.
*H02J 3/28* (2006.01)
*H02J 9/06* (2006.01)
*H02J 3/32* (2006.01)
*H02J 7/35* (2006.01)

(52) U.S. Cl.
CPC . *H02J 9/061* (2013.01); *H02J 3/28* (2013.01); *H02J 3/32* (2013.01); *H02J 7/35* (2013.01); *H02J 9/062* (2013.01); *Y02B 10/72* (2013.01); *Y02E 10/566* (2013.01); *Y02E 70/30* (2013.01); *Y10T 307/625* (2015.04)

(58) Field of Classification Search
CPC ........................................... H02J 3/28
USPC .......................... 307/64, 43–46, 66
See application file for complete search history.

(56) References Cited

U.S. PATENT DOCUMENTS 7,800,248 B2 * 9/2010 Kramer et al. ................ 307/65
8,350,411 B2 * 1/2013 Kimball et al. ............... 307/64

(Continued)

FOREIGN PATENT DOCUMENTS

JP 2002112461 A 4/2002
JP 2002142460 A 5/2002

OTHER PUBLICATIONS

Supplementary European Search Report mailed Apr. 4, 2014 for European Application No. 11 86 0911 (5 Pages).

*Primary Examiner* — Adi Amrany
(74) *Attorney, Agent, or Firm* — Nutter McClennen & Fish LLP; John J. Penny, Jr.; Michael P. Visconti, III (57) ABSTRACT

A power control device is provided, the power control device comprising a first conversion part configured to convert DC voltage power into AC voltage power, the DC voltage power being output from a power generation part configured to generate power using natural energy; a second conversion part configured to convert the AC voltage power output from the first conversion part into DC voltage power; and a controller configured to control output power of the second conversion part based on a voltage value of the power output from the power generation part when supply of power from an external power system is stopped.

4 Claims, 7 Drawing Sheets

(56) References Cited

U.S. PATENT DOCUMENTS

| | | | |
|---|---|---|---|
| 8,379,418 B2* | 2/2013 | Falk | 363/49 |
| 8,456,878 B2* | 6/2013 | Min | 363/95 |
| 8,513,913 B2* | 8/2013 | Dubovsky | 320/101 |
| 2004/0207366 A1* | 10/2004 | Sung | 320/140 |
| 2005/0006958 A1 | 1/2005 | Dubovsky | |
| 2011/0089886 A1* | 4/2011 | Dubovsky | 320/101 |
| 2011/0148195 A1* | 6/2011 | Lee | 307/25 |
| 2011/0210694 A1* | 9/2011 | Uehashi et al. | 320/101 |
| 2011/0221383 A1* | 9/2011 | Uehashi et al. | 320/101 |

* cited by examiner

POWER CONTROL DEVICE AND POWER CONTROL METHOD

CROSS-REFERENCE TO RELATED APPLICATION(S)

This application claims the benefit of priority from Japanese Patent Application No. 2011-056954, filed on 15 Mar. 2011, and International Application No. PCT/JP2011/056749, filed on 22 Mar. 2011 and designating the United States, the entire contents of which is incorporated herein by reference for all purposes.

BACKGROUND

The present invention relates to a power control device and a power control method, particularly to a power control device and a power control method for being able to stably output power during autonomous output.

Nowadays, a solar power generation system provided with a solar power generation panel and a storage battery is in widespread use. In the solar power generation system, after DC voltage power generated by the solar power generation panel is converted into AC voltage power by a power conditioner, the AC voltage power is supplied to and consumed by a load, or returned to a commercial power system and sold. The power is stably supplied regardless of weather by recharging a storage battery with the power generated by the solar power generation panel.

For example, Patent Document 1 (Japanese Unexamined Patent Publication No. 2002-142460) discloses a power conversion device that converts the DC voltage power generated by the solar power generation panel into the AC voltage power. Patent Document 2 (Japanese Unexamined Patent Publication No. 2002-112461) discloses a power conversion device that can detect a system voltage of a power system to switch between output voltages of AC voltages of 100 V and 200 V.

When power outage is generated to stop supply of the power from the commercial power system, the solar power generation system becomes an autonomous operation mode in which an autonomous operation is performed independently of the commercial power system. In the autonomous operation mode, the power generated by the solar power generation panel or the power stored in the storage battery is converted into the power of the AC voltage of 100 V by the power conditioner and supplied to the load.

However, in the solar power generation system, the voltage of the power output from the solar power generation panel decreases largely when the power conditioner makes a request to the solar power generation panel to supply the excessively large power during the autonomous output caused by the power outage. Therefore, the power generated by the solar power generation panel decreases temporarily significantly, and sometimes the power is hardly stably output.

The present invention has been devised to solve the problems described above, and an object thereof is to be able to stably output the power during the autonomous output.

SUMMARY

In accordance with one aspect of at least one embodiment of the present invention, a power control device comprises: a first conversion part configured to convert DC voltage power into AC voltage power, the DC voltage power being output from a power generation part configured to generate power using natural energy; a second conversion part configured to convert the AC voltage power output from the first conversion part into DC voltage power; and a controller configured to control output power of the second conversion part based on a voltage value of the power output from the power generation part when supply of power from an external power system is stopped.

In accordance with another aspect of at least one embodiment of the present invention, a power control method for a power control device including a first conversion part configured to convert DC voltage power into AC voltage power, the DC voltage power being output from a power generation part configured to generate power using natural energy, and a second conversion part configured to convert the AC voltage power output from the first conversion part into DC voltage power, the power control method comprises a step of controlling output power of the second conversion part based on a voltage value of the power output from the power generation part when supply of power from an external power system is stopped.

DETAILED DESCRIPTION

Hereinafter, specific embodiments of the present invention will be described in detail with reference to the drawings.

Figure 1:
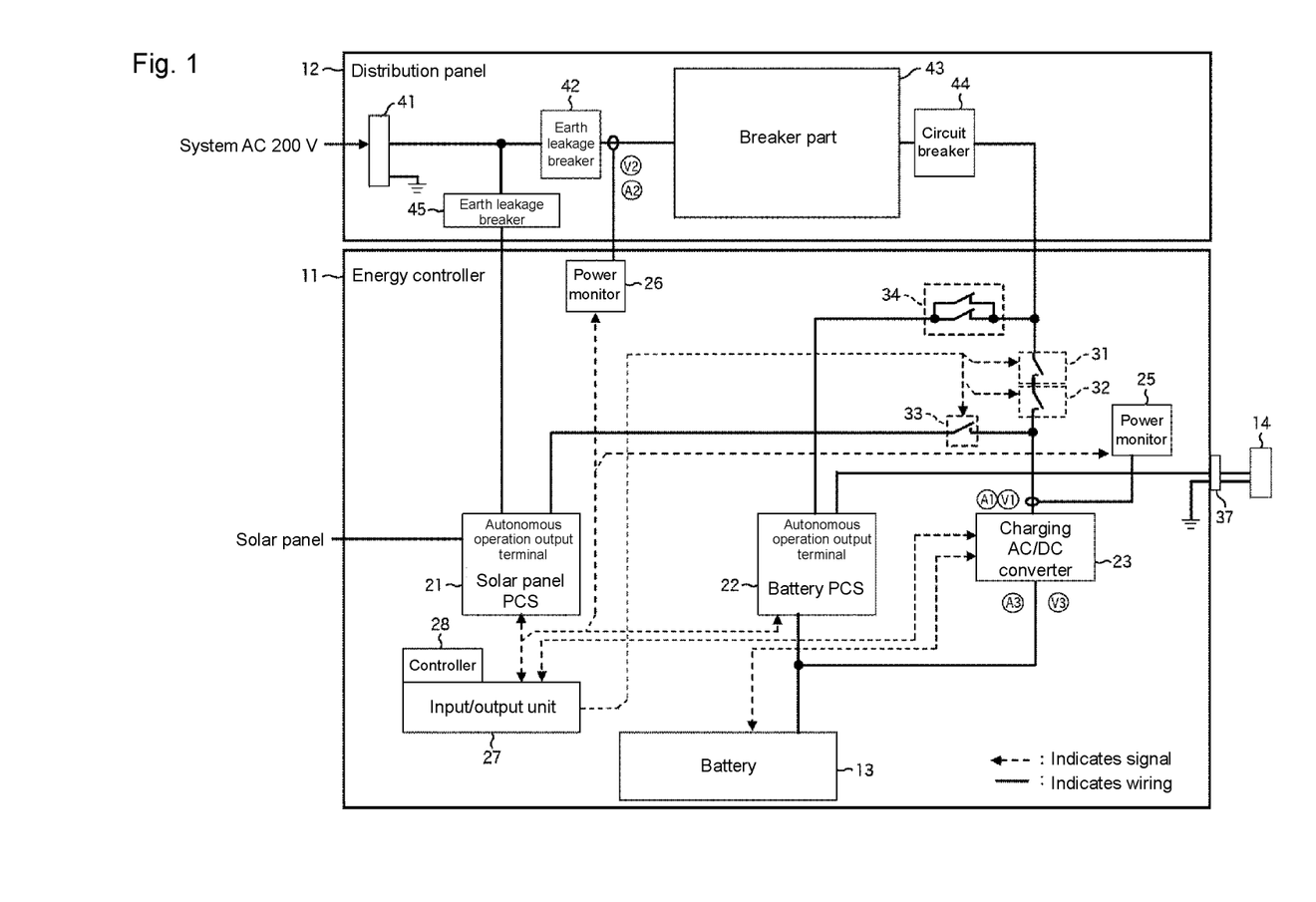
FIG. 1 is a block diagram illustrating a configuration example of an energy controller according to a first embodiment of the present invention.

FIG. 1 is a block diagram illustrating a configuration example of an energy controller according to a first embodiment of the present invention.

Referring to FIG. 1, an energy controller 11 is connected to a solar panel (not illustrated), and connected through a distribution panel 12 to a commercial power system that supplies power of AC voltage of 200 V.

The energy controller 11 performs power control such that a battery 13 is recharged with the power generated by the solar panel and the power supplied from the commercial power system, and such that the power generated by the solar panel and the power with which the battery 13 is recharged is supplied to a load. The energy controller 11 includes a normal operation mode and an autonomous operation mode. The normal operation mode is an operation mode during a normal time in which the power is supplied from the commercial power system. The autonomous operation mode is an operation mode during power outage in which the supply of the power from the commercial power system is stopped. The energy controller 11 supplies the power to the load through the distribution panel 12 in the normal operation mode, and supplies the power to the load connected to an autonomous output outlet 14 in the autonomous operation mode.

The energy controller 11 includes a solar panel PCS (Power Conditioning System) 21, a battery PCS 22, a charging AC/DC (Alternating Current/Direct Current) converter 23, power monitors 25 and 26, an input/output unit 27, and a controller 28.

In the energy controller 11, relays 31 and 32 are connected in series with a wiring connecting the charging AC/DC converter 23 and a circuit breaker 44 of the distribution panel 12. A relay 33 is connected to a wiring connecting an autonomous operation output terminal of the solar panel PCS 21 and a wiring connecting the relay 32 and the charging AC/DC converter 23. A relay 34 is connected to a wiring connecting the battery PCS 22 and a wiring connecting the relay 31 and the circuit breaker 44 of the distribution panel 12. A terminal 37 is provided in a casing of the energy controller 11, and the autonomous operation output terminal of the battery PCS 22 and the autonomous output outlet 14 are connected to each other through the terminal 37.

In the distribution panel 12, a terminal 41 is connected to a power line of the commercial power system. A wiring connected to the terminal 41 is connected to the battery PCS 22 and the charging AC/DC converter 23 through an earth leakage breaker 42, a breaker part 43, and the circuit breaker 44. The solar panel PCS 21 is connected to the wiring connecting the terminal 41 and the earth leakage breaker 42 through an earth leakage breaker 45. The breaker part 43 includes plural breakers, and the load such as an electric instrument in a house is connected through the breakers.

The solar panel PCS 21 adjusts the power generated by the solar panel, converts the DC voltage power generated by the solar panel into the AC voltage power, and outputs the AC voltage power. For example, when the energy controller 11 is in the normal operation mode, the solar panel PCS 21 converts the power supplied from the solar panel into the power of AC voltage of 200 V, and supplies the power of AC voltage of 200 V to the distribution panel 12. The power of AC voltage of 200 V is supplied to the load which is connected to each breaker of the breaker part 43 through the earth leakage breaker 45 and the earth leakage breaker 42, or returned to the commercial power system through the earth leakage breaker 45 and the terminal 41 to sell the electric power.

The solar panel PCS 21 includes the autonomous operation output terminal. When the controller 28 supplies a signal (hereinafter properly referred to as an autonomous operation signal) issuing an instruction to transfer to the autonomous operation mode, the solar panel PCS 21 outputs the power of the AC voltage of 100 V from the autonomous operation output terminal. The power output from the autonomous operation output terminal of the solar panel PCS 21 is supplied to the charging AC/DC converter 23 through the relay 33.

The battery PCS 22 converts the power accumulated in the battery 13 into the AC voltage power, and outputs the AC voltage power. For example, when the energy controller 11 is in the normal operation mode, the battery PCS 22 converts the power supplied from the battery 13 into the power of the AC voltage of 200 V, and supplies the power of the AC voltage of 200 V to the distribution panel 12 through the relay 34. The power is adjusted according to a consumed power at the load, supplied only to the load connected to the breaker part 43 through the circuit breaker 44, and prevented from flowing out to the commercial power system.

The battery PCS 22 includes the autonomous operation output terminal, and outputs the power of the AC voltage of 100 V from the autonomous operation output terminal when the controller 28 supplies the autonomous operation signal. The power output from the autonomous operation output terminal of the battery PCS 22 is supplied through the terminal 37 to the load connected to the autonomous output outlet 14.

The charging AC/DC converter 23 converts the power of the AC voltage (100 V or 200 V) into the power of the DC voltage suitable for the charging of the battery 13, and recharges the battery 13. For example, the charging AC/DC converter 23 checks a charging amount of the battery 13, and recharges the battery 13 with the voltage controlled according to the charging amount. Depending on the charging amount of the battery 13, the power output from the charging AC/DC converter 23 is supplied to the battery PCS 22.

The power monitor 25 monitors the power input to the charging AC/DC converter 23, and notifies the controller 28 of the power amount (a current value A1 and a voltage value V1). The power monitor 26 monitors the power supplied from the commercial power system to the distribution panel 12, and notifies the controller 28 of the power amount (a current value A2 and a voltage value V2). The charging AC/DC converter 23 notifies the controller 28 of the power amount (a current value A3 and a voltage value V3) of the power output from the charging AC/DC converter 23.

The input/output unit 27 is an interface (for example, a system I/O board) through which each part of the energy controller 11 and the controller 28 conduct communication with each other.

The controller 28 conducts communication with each part of the energy controller 11 through the input/output unit 27 to perform various kinds of control.

For example, when the controller 28 detects that the supply of the power from the commercial power system is stopped based on the power amount of which the controller 28 is notified by the power monitor 26, namely, when the controller 28 detects the power outage, the controller 28 supplies an autonomous operation signal to the solar panel PCS 21 and the battery PCS 22. At the same time, the controller 28 turns off the relays 31 and 32 (an opened state), and turns on the relay 33 (a connected state).

For example, when detecting that the power is recovered to start the supply of the power from the commercial power system, the controller 28 supplies a signal canceling the autonomous operation to the solar panel PCS 21 and the battery PCS 22. At the same time, the controller 28 turns on the relays 31 and 32, and turns off the relay 33.

In the energy controller 11, the relays 31 and 32 are turned off while the relay 33 is turned on in the autonomous operation mode, and the relays 31 and 32 are turned on while the relay 33 is turned off in the normal operation mode. Thus, the relays 31 to 33 are constructed as an exclusive circuit such that the relays 31 and 32 and the relay 33 function exclusively between the turn-on and the turn-off.

A power route of the energy controller 11 during the power outage and the normal time will be described below with reference to FIGS. 2 and 3. Each power route is expressed by a thick line in FIGS. 2 and 3.

Figure 2:
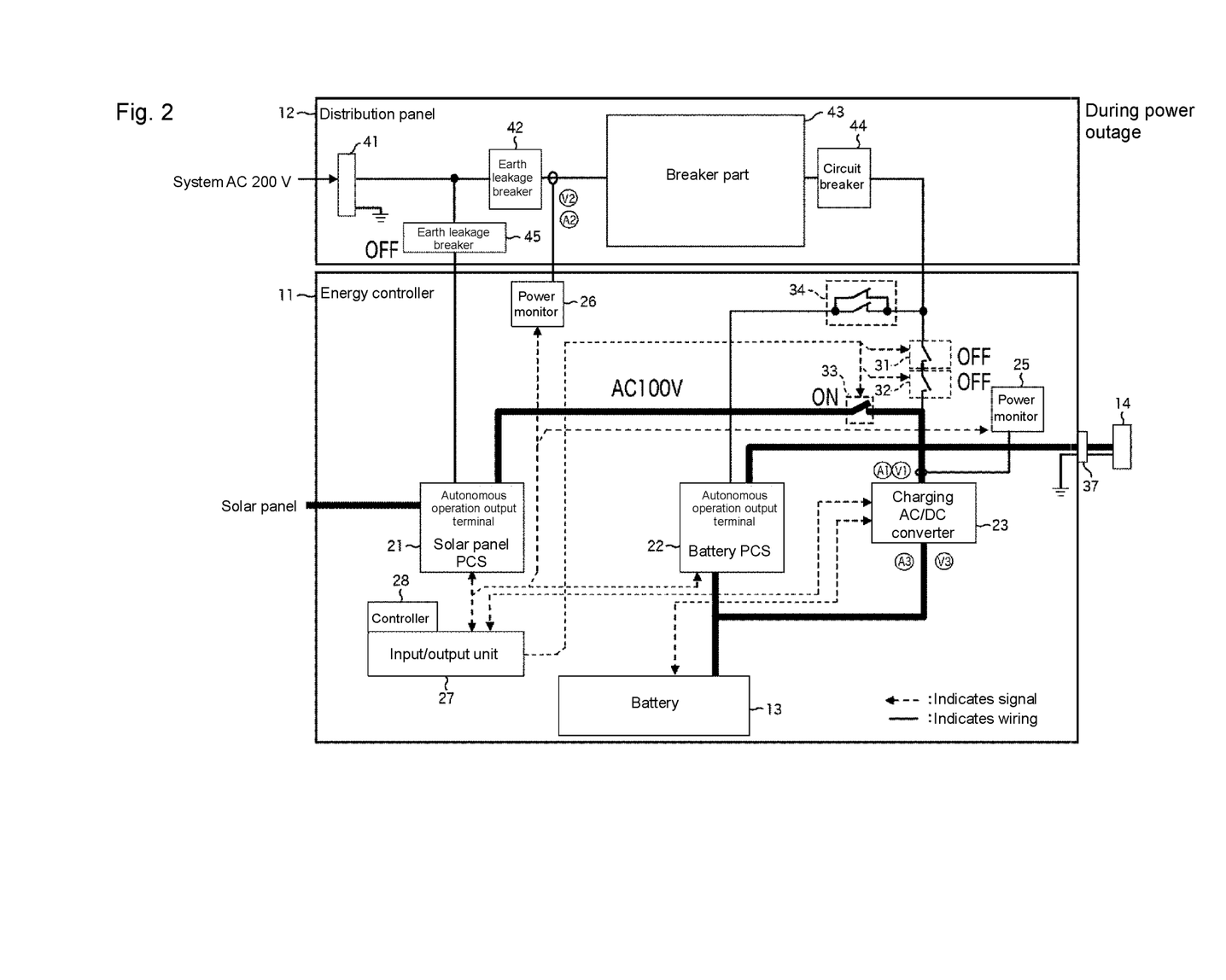
FIG. 2 illustrates a power route during power outage.

FIG. 2 illustrates the power route during the power outage.

As described above, when detecting that the supply of the power from the commercial power system is stopped based on the power amount of which the controller 28 is notified by the power monitor 26, the controller 28 supplies the autonomous operation signal to the solar panel PCS 21 and the battery PCS 22. At the same time, the controller 28 turns off the relays 31 and 32 and turns on the relay 33.

In response to the autonomous operation signal, the solar panel PCS 21 converts the DC voltage power supplied from the solar panel into the power of the AC voltage of 100 V, and outputs the power of the AC voltage of 100 V from the autonomous operation output terminal. At this point, because the relay 33 is turned on, the power output from the autonomous operation output terminal of the solar panel PCS 21 is supplied to the charging AC/DC converter 23 through the relay 33.

At this point, because the relays 31 and 32 are turned off, the power output from the solar panel PCS 21 does not flow out onto the side of the distribution panel 12. Additionally, because the relays 31 and 32 are connected in series with each other in the energy controller 11, even if one of the relays 31 and 32 cannot be turned off due to breakdown, the other of the relays 31 and 32 can be turned off. The control can surely be performed by connecting the relays 31 and 32 in series such that the power is not output to the distribution panel 12.

The charging AC/DC converter 23 converts the AC voltage power supplied from the solar panel PCS 21 into the DC voltage power, and supplies the DC voltage power to the battery 13 or the battery PCS 22. Which one of the battery 13 and the battery PCS 22 is supplied with the power output from the charging AC/DC converter 23 is determined by the charging amount of the battery 13, the consumed power amount of the load connected to the autonomous output outlet 14 (that is, the power amount output from the battery PCS 22).

In response to the autonomous operation signal, the battery PCS 22 converts the DC voltage power supplied from the charging AC/DC converter 23 or the DC voltage power stored in the battery 13 into the power of the AC voltage of 100 V, and outputs the power of the AC voltage of 100 V from the autonomous operation output terminal. Therefore, the power output from the autonomous operation output terminal of the battery PCS 22 is supplied to the load connected to the autonomous output outlet 14.

At this point, a user who senses the power outage turns off the earth leakage breaker 45, thereby electrically disconnecting the solar panel PCS 21 and the commercial power system from each other. Even if the earth leakage breaker 45 is not turned off, in the autonomous operation mode, the solar panel PCS 21 does not output the power to the terminal connected to the commercial power system, and the power does not flow out from the solar panel PCS 21 to the distribution panel 12.

Alternatively, a relay that is opened and closed by the controller 28 is connected between the solar panel PCS 21 and the earth leakage breaker 45, and the relay may be turned off when the controller 28 detects the power outage. The controller 28 also turns off the relay 34 to electrically disconnect the battery PCS 22 and the commercial power system from each other.

Figure 3:
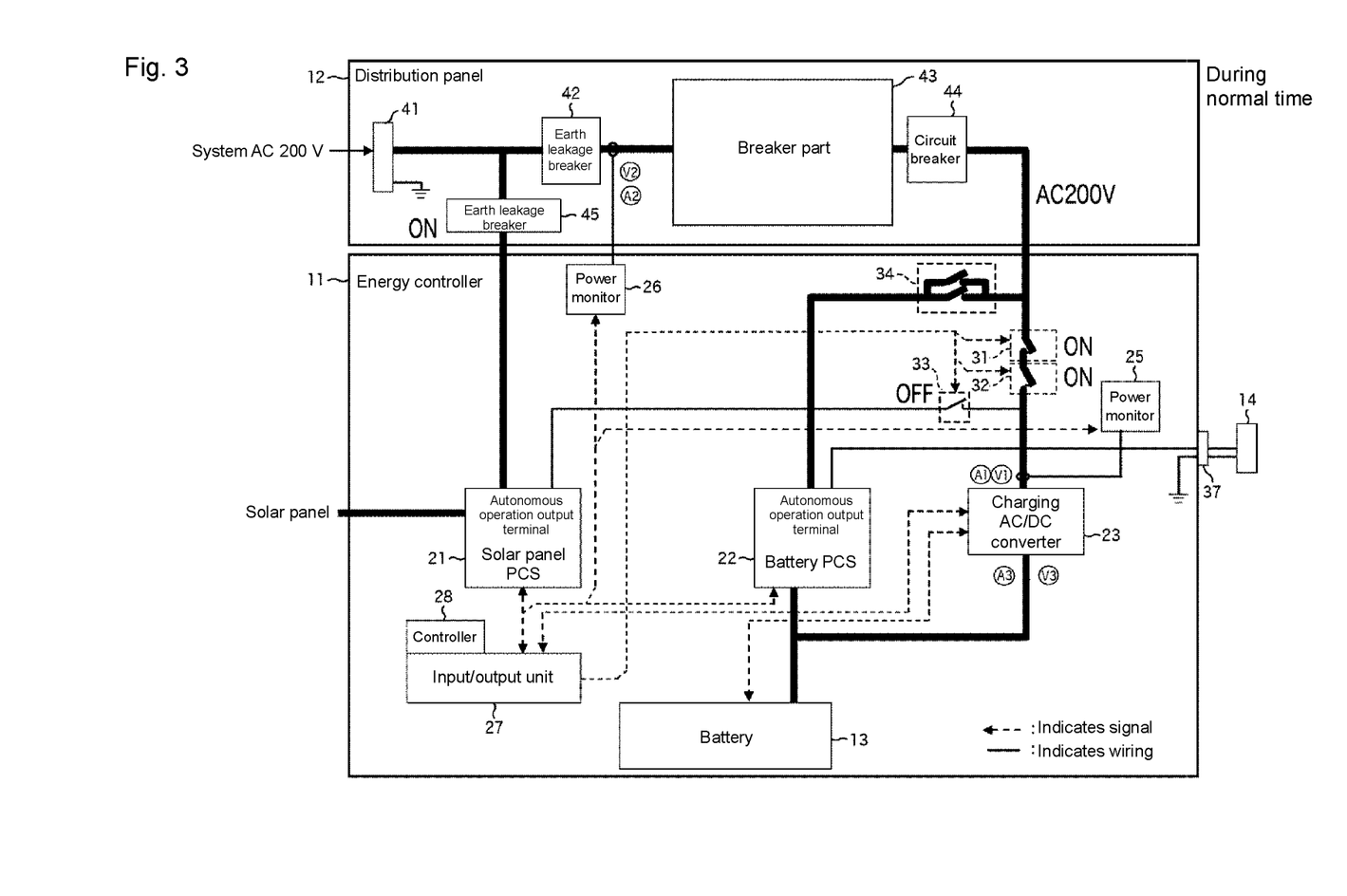
FIG. 3 illustrates the power route during a normal time.

FIG. 3 illustrates the power route in the normal time.

For example, when detecting that the supply of the power from the commercial power system is resumed based on the power amount of which the controller 28 is notified by the power monitor 26, the controller 28 supplies the signal canceling the autonomous operation to the solar panel PCS 21 and the battery PCS 22. At the same time, the controller 28 turns on the relays 31 and 32, and turns off the relay 33. The controller 28 also turns on the relay 34.

In response to the signal canceling the autonomous operation, the solar panel PCS 21 stops the power output from the autonomous operation output terminal, converts the DC voltage power supplied from the solar panel into the power of the AC voltage of 200 V, and supplies the power of the AC voltage of 200 V to the distribution panel 12. Therefore, the power generated by the solar panel is supplied to the load connected to the breaker part 43 of the distribution panel 12. At this point, the user who senses the power recovery turns on the earth leakage breaker 45.

Even if the power of the AC voltage of 100 V is output from the autonomous operation output terminal of the solar panel PCS 21, the power of the AC voltage of 100 V and the power of the AC voltage of 200 V supplied from the commercial power system are prevented from flowing into the identical route because the relay 33 is turned off.

The charging AC/DC converter 23 converts the power of the AC voltage of 200 V supplied from the commercial power system into the DC voltage power, and supplies the DC voltage power to the battery 13.

In response to the signal canceling the autonomous operation, the battery PCS 22 converts the DC voltage power supplied from the battery 13 into the power of the AC voltage of 200 V, and supplies the power of the AC voltage of 200 V to the distribution panel 12 through the relay 34. Therefore, the power stored in the battery 13 is supplied to the load connected to the breaker part 43 of the distribution panel 12.

As described above, in the energy controller 11, the power route is switched during the power outage and the normal time. Therefore, safety of a worker who recovers the power on the commercial power system side can be ensured. The situation in which the power of the AC voltage of 200 V and the power of the AC voltage of 100 V flow into the identical route is avoided, and the breakdown considered to be generated by the situation can be avoided.

The energy controller 11 is configured such that the wiring for the power, which is generated by the solar panel and converted into the AC voltage by the solar panel PCS 21, differs clearly from the wiring for the power, which is stored in the battery 13 and converted into the AC voltage by the battery PCS 22. Therefore, in the energy controller 11, only the power generated by the solar panel returns to the system, and the power stored in the battery 13 can be prevented from returning to the system.

For example, which one of the solar panel and the battery outputs the power output from the inverter cannot clearly be distinguished in the configuration of the power conversion device disclosed in Patent Document 2. On the other hand, the energy controller 11 has the configuration in which the power generated by the solar panel can easily be distinguished from the power stored in the battery 13. Accordingly, the energy controller 11 can be used without problem in an environment in which the power from the power supply except the power generated by the solar panel is prohibited from returning to the system.

Even in the power outage, the power can be supplied to some extent without being influenced by a change in weather because the energy controller 11 includes the battery 13.

When the energy controller 11 is in the autonomous operation mode, the controller 28 controls the power output from the autonomous operation output terminal of the charging AC/DC converter 23 (power control in the autonomous operation mode) based on the voltage value of the output power of the solar panel.

Figure 4:
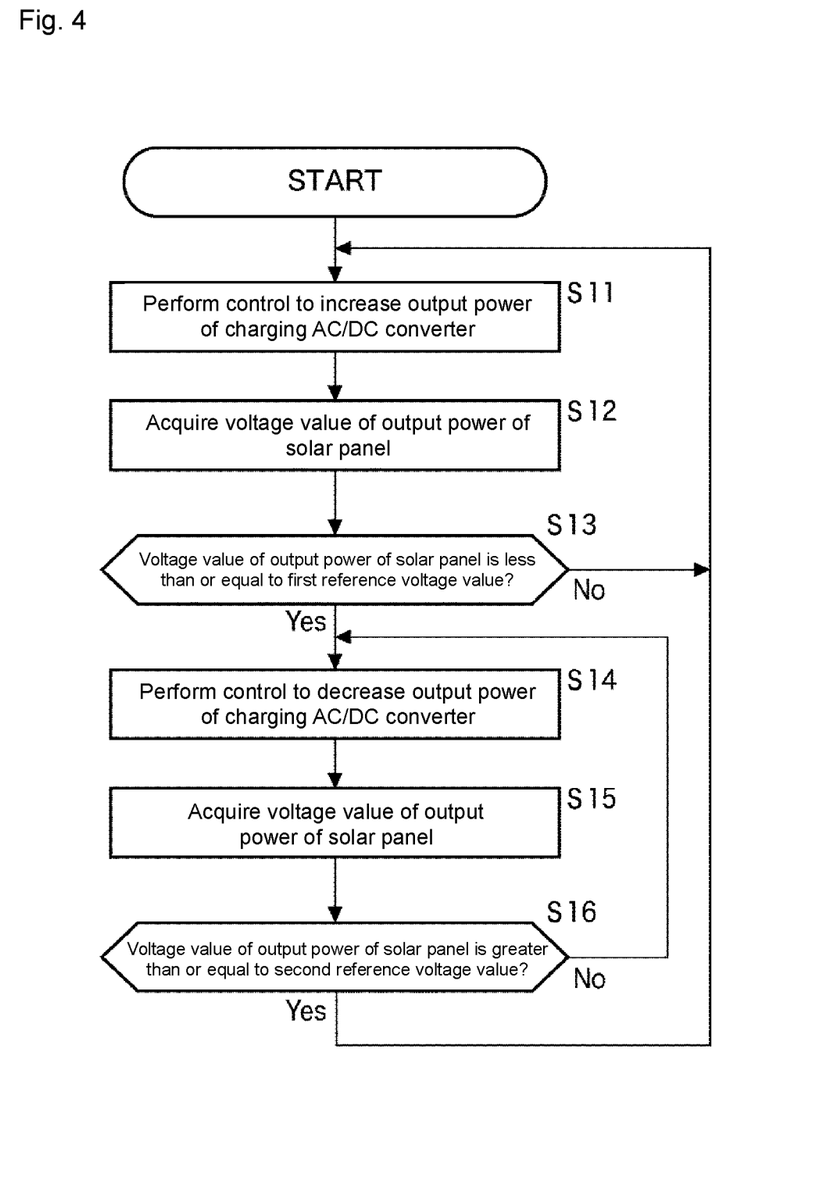
FIG. 4 is a flowchart illustrating power control processing in an autonomous operation mode.

FIG. 4 is a flowchart illustrating processing performed by the controller 28 in the power control in the autonomous operation mode.

For example, the controller 28 detects the power outage based on the power amount of which the controller 28 is notified by the power monitor 26 and outputs the autonomous operation signal. Then the controller 28 starts the power control in the autonomous operation mode.

In Step S11, the controller 28 performs the control so as to increase the output power of the charging AC/DC converter 23, and the output power of the charging AC/DC converter 23 increases.

At this point, in order to correspond to the increase in output power of the charging AC/DC converter 23, the solar panel PCS 21 makes a request to the solar panel to increase the power with increasing power supplied to the charging AC/DC converter 23 from the autonomous operation output terminal of the solar panel PCS 21. Because the power input to the solar panel PCS 21 from the solar panel increases, the voltage value of the output power of the solar panel decreases according to a power generation characteristic of the solar panel.

In Step S12, the controller 28 conducts communication with the solar panel PCS 21 to acquire the voltage value of the output power of the solar panel, namely, the voltage value of the power supplied from the solar panel to the solar panel PCS 21.

In Step S13, the controller 28 determines whether the voltage value of the output power of the solar panel acquired in Step S12 is less than or equal to a first reference voltage value.

When the controller 28 determines that the voltage value of the output power of the solar panel is not less than or equal to the first reference voltage value in Step S13, namely, when the controller 28 determines that the voltage value of the output power of the solar panel is greater than the first reference voltage value, the processing returns to Step S11 and the similar pieces of processing are repeated.

On the other hand, when the controller 28 determines that the voltage value of the output power of the solar panel is less than or equal to the first reference voltage value in Step S13, the processing goes to Step S14. That is, in this case, the voltage value of the output power of the solar panel decreases to the first reference voltage value or less by the increase in power that is input to the solar panel PCS 21 in association with the increase in output power of the charging AC/DC converter 23.

In Step S14, the controller 28 performs the control so as to decrease the output power of the charging AC/DC converter 23, and the output power of the charging AC/DC converter 23 decreases.

Therefore, the solar panel PCS 21 makes the request to the solar panel to decrease the power with decreasing power supplied to the charging AC/DC converter 23 from the autonomous operation output terminal of the solar panel PCS 21. Because the power input to the solar panel PCS 21 from the solar panel decreases, the voltage value of the output power of the solar panel increases according to the power generation characteristic of the solar panel.

In Step S15, similarly to the processing in Step S12, the controller 28 acquires the voltage value of the output power of the solar panel.

In Step S16, the controller 28 determines whether the voltage value of the output power of the solar panel acquired in Step S15 is greater than or equal to a second reference voltage value.

At this point, the second reference voltage value is higher than the first reference voltage value, and the first and second reference voltage values are previously obtained in order to define a voltage range where the solar panel stably outputs the power according to the power generation characteristic of the solar panel.

When the controller 28 determines that the voltage value of the output power of the solar panel is not greater than or equal to the second reference voltage value in Step S16, namely, when the voltage value of the output power of the solar panel is less than the second reference voltage value, the processing returns to Step S14 and the similar pieces of processing are repeated.

On the other hand, when the controller 28 determines that the voltage value of the output power of the solar panel is greater than or equal to the second reference voltage value in Step S16, the processing returns to Step S11 and the similar pieces of processing are repeated. For example, the controller 28 ends the power control in the autonomous operation mode when detecting the power recovery based on the power amount of which the controller 28 is notified by the power monitor 26.

As described above, in the autonomous operation mode, the controller 28 of the energy controller 11 controls the output voltage of the charging AC/DC converter 23 such that the voltage value of the output power of the solar panel falls within the range, which can stably output the power and is defined by the first and second reference voltage values. The power control can prevent the solar panel PCS 21 from making such request that the power generated by the solar panel decreases significantly, and the instability of the power generated by the solar panel can be prevented.

Accordingly, even in the power outage, the energy controller 11 can stably supply the power to the load connected to the autonomous output outlet 14.

For example, in the case that the load is connected to the autonomous output outlet 14, the input voltage of the battery PCS 22 increases with increasing output power of the battery PCS 22, and the power is supplied to the battery PCS 22 from the battery 13 and the charging AC/DC converter 23. At this point, if there is no the power output from the charging AC/DC converter 23, the power is supplied to the battery PCS 22 from the battery 13. On the other hand, in the case that the load is not connected to the autonomous output outlet 14, the power battery 13 is recharged with the power when the output power of the charging AC/DC converter 23 is increased.

Figure 5:
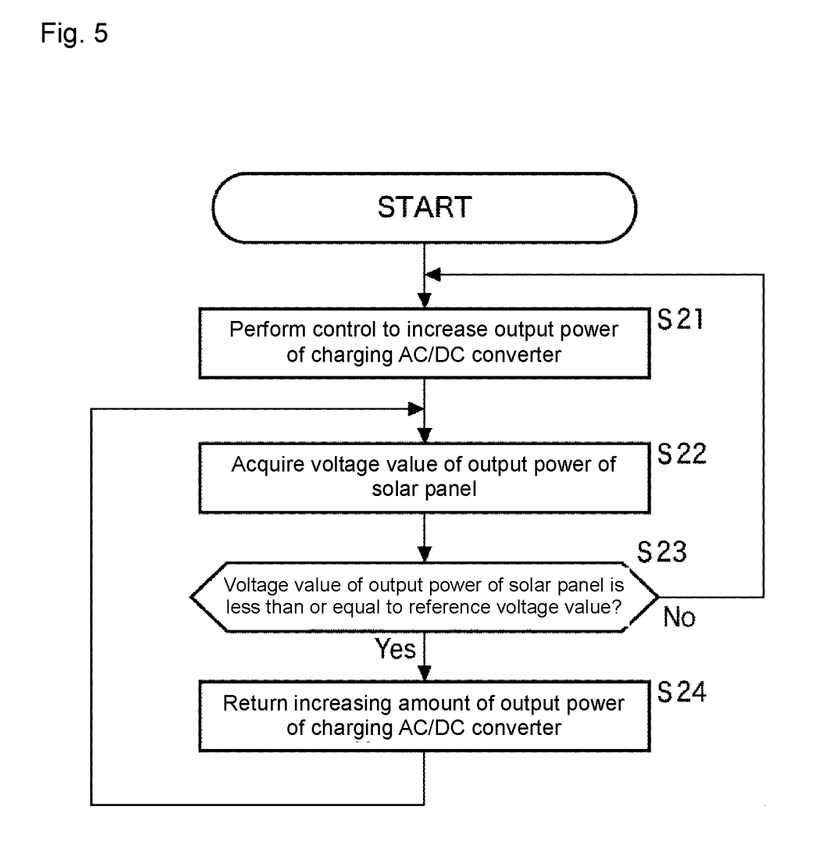
FIG. 5 is a flowchart illustrating another piece of power control processing in the autonomous operation mode.

FIG. 5 is a flowchart illustrating another piece of processing performed by the controller 28 in the power control in the autonomous operation mode.

In Step S21, the controller 28 performs the control so as to increase the output power of the charging AC/DC converter 23 by a predetermined increasing amount, and the output power of the charging AC/DC converter 23 increases by a predetermined increasing amount. Therefore, the solar panel PCS 21 makes the request to the solar panel to increase the power, and the voltage value of the output power of the solar panel decreases.

In Step S22, the controller 28 conducts the communication with the solar panel PCS 21 to acquire the voltage value of the output power of the solar panel.

In Step S23, the controller 28 determines whether the voltage value of the output power of the solar panel acquired in Step S22 is less than or equal to a reference voltage value. At this point, for example, the reference voltage value is previously obtained such that the maximum output power is obtained in the solar panel.

When the controller 28 determines that the voltage value of the output power of the solar panel is not less than or equal to the reference voltage value in Step S23, namely, when the controller 28 determines that the voltage value of the output power of the solar panel is greater than the reference voltage value, the processing returns to Step S21 and the similar pieces of processing are repeated.

On the other hand, when the controller 28 determines that the voltage value of the output power of the solar panel is less than or equal to the reference voltage value in Step S23, the processing goes to Step S24.

In Step S24, the controller 28 performs the control so as to decrease the output power of the charging AC/DC converter 23 according to the increasing amount increased in the preceding Step S21, and the output power of the charging AC/DC converter 23 returns by the amount identical to the increasing amount.

After the processing in Step S24, the processing returns to Step S22 and the similar pieces of processing are repeated. For example, the controller 28 ends the power control in the autonomous operation mode when detecting the power recovery based on the power amount of which the controller 28 is notified by the power monitor 26.

As described above, in the autonomous operation mode, the controller 28 of the energy controller 11 controls the output power of the charging AC/DC converter 23 such that the voltage value of the output power of the solar panel follows the voltage value at which the maximum power can be output. The power control can prevent the solar panel PCS 21 from making such request that the power generated by the solar panel decreases significantly, and the instability of the power generated by the solar panel can be prevented.

Accordingly, even in the power outage, the energy controller 11 can stably supply the power to the load connected to the autonomous output outlet 14.

In addition to the control of the output power of the charging AC/DC converter 23 based on the voltage value of the output power of the solar panel, the controller 28 may feed back the current value or the voltage value of the power output from the autonomous operation output terminal of the solar panel PCS 21 to control the output power of the charging AC/DC converter 23. The power can more stably be supplied to the load connected to the autonomous output outlet 14.

Thus, the output power of the charging AC/DC converter 23 is controlled based on the voltage value of the power output from the solar panel when supply of power from the commercial power system is stopped, and the power can stably be output during the autonomous output.

Figure 6:
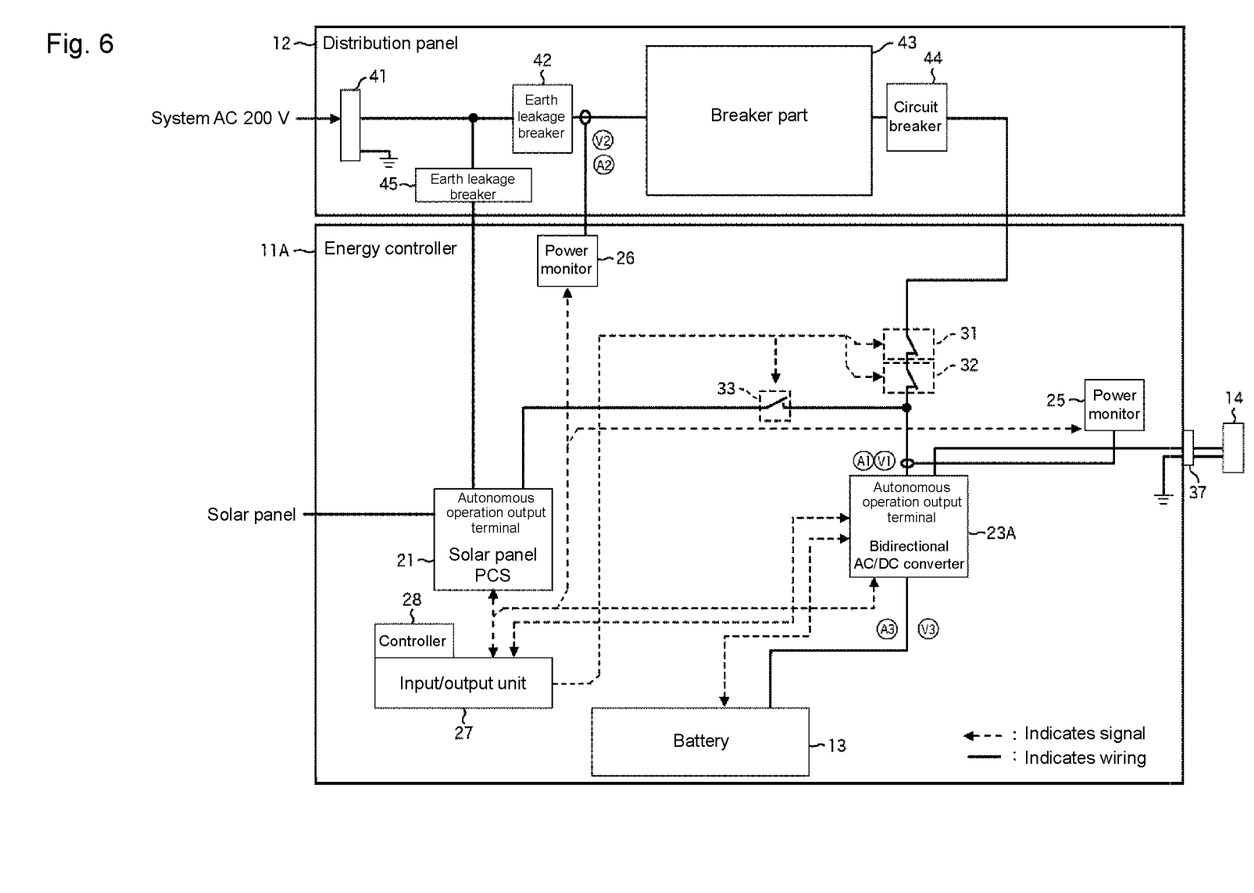
FIG. 6 is a block diagram illustrating a configuration example of an energy controller according to a second embodiment of the present invention.

FIG. 6 is a block diagram illustrating a configuration example of an energy controller according to a second embodiment of the present invention.

Referring to FIG. 6, similarly to the energy controller 11 in FIG. 1, an energy controller 11A is connected to the solar panel (not illustrated), and connected through the distribution panel 12 to the commercial power system that supplies the power of the AC voltage of 200 V.

The configuration of the energy controller 11A is identical to that of the energy controller 11 in FIG. 1 in that the energy controller 11A includes the solar panel PCS 21, the power monitors 25 and 26, the input/output unit 27, the controller 28, and the relays 31 to 33, and the detailed description of the energy controller 11A is omitted. That is, the configuration of the energy controller 11A differs from that of the energy controller 11 in that the energy controller 11A includes a bidirectional AC/DC converter 23A.

The bidirectional AC/DC converter 23A converts the AC voltage power supplied through the distribution panel 12 into the DC voltage power, and supplies the DC voltage power to the battery 13 to recharge the battery 13. During the normal time, the bidirectional AC/DC converter 23A converts the DC voltage power supplied from the battery 13 into the AC voltage power, and supplies the AC voltage power through the distribution panel 12 to the load connected to each breaker of the breaker part 43. During the power outage, the bidirectional AC/DC converter 23A supplies the AC voltage power, into which the DC voltage power supplied from the battery 13 is converted, or the AC voltage power supplied from the autonomous operation output terminal of the solar panel PCS 21 to the load connected to the autonomous output outlet 14.

That is, the bidirectional AC/DC converter 23A is configured to have both the functions of the battery PCS 22 and the charging AC/DC converter 23 in FIG. 1.

In the energy controller 11A, when the power outage is detected, the controller 28 also performs the power control in the autonomous operation mode (the pieces of processing of the flowchart in FIG. 4 or 5). That is, the controller 28 controls the power output from the autonomous operation output terminal of the bidirectional AC/DC converter 23A based on the voltage value of the output power of the solar panel.

Not only the energy controller 11A can prevent the instability of the power generated by the solar panel similarly to the energy controller 11 in FIG. 1, but also the bidirectional AC/DC converter 23A has both the functions of the battery PCS 22 and the charging AC/DC converter 23 in FIG. 1 to be able to achieve simplification and downsizing of the device.

Figure 7:
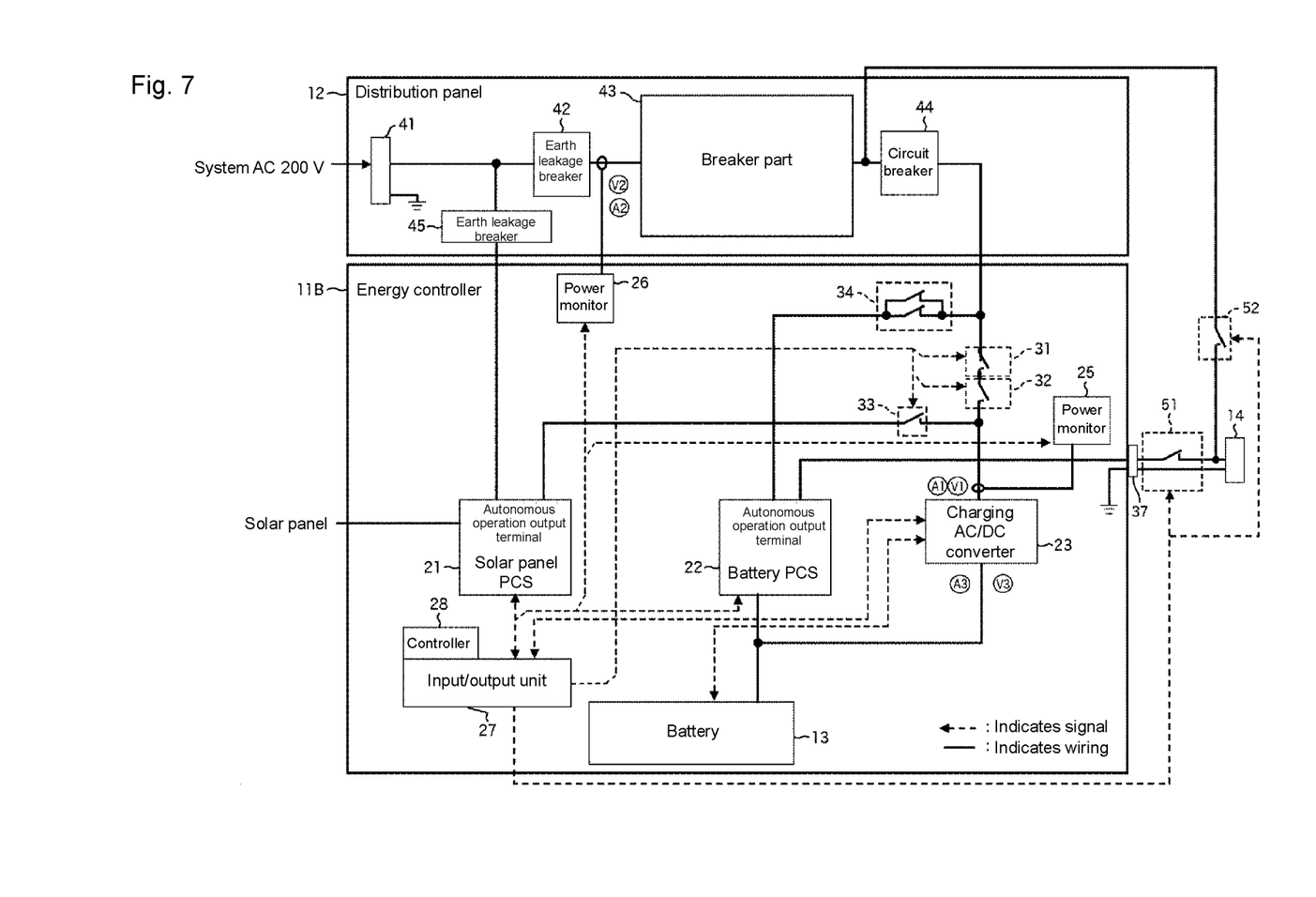
FIG. 7 is a block diagram illustrating a configuration example of an energy controller according to a third embodiment of the present invention.

FIG. 7 is a block diagram illustrating a configuration example of an energy controller according to a third embodiment of the present invention.

Referring to FIG. 7, similarly to the energy controller 11 in FIG. 1, an energy controller 11B is connected to the solar panel (not illustrated), and connected through the distribution panel 12 to the commercial power system that supplies the power of the AC voltage of 200 V.

The energy controller 11B includes each block included in the energy controller 11 in FIG. 1, and the detailed description of the block is omitted. The energy controller 11B further includes relays 51 and 52.

In the energy controller 11B, the relay 51 is connected to the wiring connecting the terminal 37 and the autonomous output outlet 14. The relay 52 is connected to the wiring connecting the relay 51 and the autonomous output outlet 14 and the wiring connecting the breaker part 43 and the circuit breaker 44 of the distribution panel 12.

The relays 51 and 52 are constructed as the exclusive circuit so as to be turned on and turned off through the input/output unit 27 under the control of the controller 28. That is, the relays 51 and 52 are configured such that the relay 51 is turned on while the relay 52 is turned off, and such that the relay 51 is turned off while the relay 52 is turned on.

In the energy controller 11B having the above configuration, the controller 28 performs the control such that the relay 51 is turned off while the relay 52 is turned on in the normal operation mode. On the other hand, the controller 28 performs the control such that the relay 51 is turned on while the relay 52 is turned off in the autonomous operation mode.

Accordingly, in the energy controller 11B, the power is supplied to the autonomous output outlet 14 through the distribution panel 12 during the normal time, and the power is supplied to the autonomous output outlet 14 through the autonomous operation output terminal of the battery PCS 22 during the power outage. That is, in both the normal time and the power outage, the energy controller 11B can supply the power to the load connected to the autonomous output outlet 14.

The controller 28 also includes a CPU (Central Processing Unit), a ROM (Read Only Memory), a RAM (Random Access Memory), a flash memory (for example, an EEPROM (Electronically Erasable and Programmable Read Only Memory)), and a program stored in the ROM or the flash memory is loaded on the RAM and executed, thereby performing the power control. Not only the program executed by the CPU is previously stored in the ROM and the flash memory, but also the program can properly be downloaded to the flash memory and updated.

Each piece of processing in the flowchart may not be performed in the sequence of the flowchart, some of the pieces of processing are concurrently or independently performed (for example, parallel processing and processing performed by an object). The program may be executed by one CPU or executed in a distributed manner by plural CPUs.

The power generation system in which the solar power generation panel is used as the power generation means is described in the embodiments. However, in addition to the solar power generation panel, the technology of the present invention can be applied to power generation systems, such as wind-power generation, in which the power generation means for generating the power using the natural energy is used.

The present invention is not limited to the embodiments, but various changes can be made without departing from the scope of the present invention.

The invention claimed is:

1. A power control device comprising:
a first conversion part that converts DC voltage power into AC voltage power, the DC voltage power being output from a power generation part configured to generate power using natural energy;
a second conversion part that converts the AC voltage power output from the first conversion part into DC voltage power;
a controller that performs control to increase or decrease the DC voltage power output from the second conversion part based on a voltage value of the power output from the power generation part when the controller detects that supply of power from an external power system is stopped;
an accumulation part that accumulates the DC voltage power output from the second conversion part; and
a third conversion part that converts the DC voltage power output from the second conversion part into AC voltage power and that supplies the AC voltage power to a load,
wherein the third conversion part outputs the AC voltage power from an output terminal connected to an autonomous output outlet when the controller detects that the supply of the power from the external power system is stopped,
wherein the controller stops performing the control to increase or decrease the DC voltage power output from the second conversion part based on the voltage value of the power output from the power generation part when the controller detects that the power from the external power system is supplied;
wherein the controller performs control to increase or decrease the DC voltage power output from the second conversion part;
wherein the controller acquires the voltage value of the power output from the power generation part and determines whether the voltage value of the power output from the power generation part acquired is less than or equal to a first reference voltage value and whether the voltage value of the power output from the power generation part acquired is greater than or equal to a second reference voltage value;
wherein the controller decreases the DC voltage power output from the second conversion part to decrease the power output from the power generation part when the voltage value of the power output from the power generation part is less than or equal to the first reference voltage value, and the controller increases the DC voltage power output from the second conversion part to increase the power output from the power generation part when the voltage value of the power output from the power generation part is greater than or equal to the second reference voltage value, the second reference voltage value being greater than the first reference voltage value;
wherein the controller is configured such that when the controller increases the DC voltage power output from the second conversion part by a predetermined increasing amount and subsequently the controller has to decrease the DC voltage power output from the second conversion part, the DC voltage power output from the second conversion part is decreased by an amount identical to the predetermined increasing amount.

2. The power control device according to claim 1, wherein the power from the output terminal of the third conversion part and the power from the external power system are exclusively switched to be supplied to the autonomous output outlet.

3. The power control device according to claim 1, wherein the power from the output terminal of the third conversion part and the power from the external power system are exclusively switched to be supplied to the autonomous output outlet.

4. A power control method for a power control device including a first conversion part that converts DC voltage power into AC voltage power, the DC voltage power being output from a power generation part configured to generate power using natural energy, a second conversion part that converts the AC voltage power output from the first conversion part into DC voltage power, an accumulation part that accumulates the DC voltage power output from the second conversion part, and a third conversion part that converts the DC voltage power output from the second conversion part into AC voltage power and that supplies the AC voltage power to a load, the power control method comprising:
a step of performing control, by a controller, to increase or decrease the DC voltage power output from the second conversion part based on a voltage value of the power output from the power generation part when the controller detects that supply of power from an external power system is stopped;
a step of stopping performing the control to increase or decrease the DC voltage power from the second conversion part based on the voltage value of the power output from the power generation part when the controller detects that the power from the external power system is supplied;
a step of outputting from the third conversion part AC voltage power from an output terminal connected to an autonomous output outlet when the controller detects that the supply of the power from the external power system is stopped;
a step of performing control, by the controller, to increase or decrease the DC voltage power output from the second conversion part;
a step of acquiring, by the controller, the voltage value of the power output from the power generation part;
a step of determining, by the controller, whether the voltage value of the power output from the power generation part acquired is less than or equal to a first reference voltage value and whether the voltage value of the power output from the power generation part acquired is greater than or equal to a second reference voltage value;
a step of performing control, by the controller, to decrease the DC voltage power output from the second conversion part to decrease the power output from the power generation part when the voltage value of the power output from the power generation part is less than or equal to the first reference voltage value; and a step of performing control, by the controller, to increase the DC voltage power output from the second conversion part to increase the power output from the power generation part when the voltage value of the power output from the power generation part is greater than or equal to the second reference voltage value, wherein the second reference voltage value being greater than the first reference voltage value, wherein when the controller increases the DC voltage power output from the second conversion part by a predetermined increasing amount and subsequently the controller has to decrease the DC voltage power output from the second conversion part, the DC voltage power output from the second conversion part is decreased by an amount identical to the predetermined increasing amount.

* * * * *